(12) United States Patent
Ostrander

(10) Patent No.: US 10,036,543 B2
(45) Date of Patent: Jul. 31, 2018

(54) MULTI-PURPOSE LIGHT EMITTING DIODE FLARE

(71) Applicant: MARCHE INTERNATIONAL LLC, Lawrence, KS (US)

(72) Inventor: Christopher J. Ostrander, Lawrence, KS (US)

(73) Assignee: Marche International LLC, Lawrence, KS (US)

( * ) Notice: Subject to any disclaimer, the term of this patent is extended or adjusted under 35 U.S.C. 154(b) by 0 days.

(21) Appl. No.: 14/884,579

(22) Filed: Oct. 15, 2015

(65) Prior Publication Data

US 2016/0109105 A1 Apr. 21, 2016

Related U.S. Application Data

(60) Provisional application No. 62/064,332, filed on Oct. 15, 2014.

(51) Int. Cl.
*F21S 9/02* (2006.01)
*F21V 23/04* (2006.01)
(Continued)

(52) U.S. Cl.
CPC ........ *F21V 23/0407* (2013.01); *B60Q 1/2615* (2013.01); *B60Q 1/52* (2013.01);
(Continued)

(58) Field of Classification Search
CPC . F21K 9/00; F21K 9/232; F21K 9/238; F21K 9/66; F21L 19/00; F21L 4/02; F21L 4/027; F21L 4/00; F21L 4/27; F21L 4/08; F21S 10/06; F21S 6/00; F21S 9/02; F21V 23/0407; F21V 23/0414; F21V 3/00; F21V 7/043; F21V 23/04; F21V 23/001; F21V 23/003; F21V 23/0492; F21Y 2107/90; F21Y 2115/10; F21Y 2113/10; F21Y 2113/13; G02F 2001/133342; B60Q 1/52; E01F 9/662; F21W 2111/00; F21W 2111/10; H05B 37/029; H05B 39/09
See application file for complete search history.

(56) References Cited

U.S. PATENT DOCUMENTS 5,036,442 A * 7/1991 Brown .................. A63B 15/00
362/102
5,929,788 A * 7/1999 Vukosic ............... B60Q 1/2611
340/471

(Continued)

*Primary Examiner* — Hargobind S Sawhney
(74) *Attorney, Agent, or Firm* — Law Office of Mark Brown, LLC; Christopher M. DeBacker

(57) ABSTRACT

A road flare including a two-sided panel, each side containing a grid of light-emitting diodes (LEDs). In a preferred embodiment one side would include typical white or standard colored LEDs and the other side would include red or other color LED. Each panel has several modes of lighting, which is selectable via a power switch or other switch. The different modes include solid lights, blinking lights, off, or a combination thereof. For example, the red side of the panel may be set to blinking or flashing, while the white side of the panel could be constantly lit. This creates a flashing hazard strobe facing away from a vehicle to warn oncoming vehicles, and a solid white light source aimed towards the vehicle to assist with repairs or other tasks.

10 Claims, 4 Drawing Sheets

(51) Int. Cl.
  B60Q 1/52 (2006.01)
  E01F 9/662 (2016.01)
  B60Q 1/26 (2006.01)
  *F21W 111/00* (2006.01)
  *F21Y 115/10* (2016.01)
  *F21Y 113/13* (2016.01)
  *F21Y 107/90* (2016.01)

(52) U.S. Cl.
  CPC ............. E01F 9/662 (2016.02); *F21S 9/02* (2013.01); *F21V 23/04* (2013.01); *F21W 2111/00* (2013.01); *F21Y 2107/90* (2016.08); *F21Y 2113/13* (2016.08); *F21Y 2115/10* (2016.08)

(56) References Cited

U.S. PATENT DOCUMENTS

| | | | |
|---|---|---|---|
| 6,100,800 A | 8/2000 | Sigari | |
| 6,246,314 B1 | 6/2001 | Djaid | |
| 6,293,684 B1 * | 9/2001 | Riblett | F21L 4/02 200/60 |
| 7,287,874 B2 * | 10/2007 | Irisawa | F21L 4/02 340/815.45 |
| 7,406,750 B2 * | 8/2008 | Hosel | D01G 31/00 19/0.22 |
| 7,407,304 B2 | 8/2008 | Tasson et al. | |
| 8,072,345 B2 | 12/2011 | Gallo | |
| 8,783,908 B2 * | 7/2014 | Gross | F21L 4/027 362/184 |
| 2003/0020627 A1 * | 1/2003 | Vukosic | G08B 5/36 340/815.45 |
| 2004/0062039 A1 * | 4/2004 | Ahn | F21L 13/08 362/192 |
| 2005/0018435 A1 | 1/2005 | Selkee et al. | |
| 2006/0082988 A1 * | 4/2006 | Riblett | F21L 4/02 362/120 |
| 2006/0092623 A1 * | 5/2006 | Irisawa | F21L 4/02 362/102 |
| 2010/0084997 A1 * | 4/2010 | Oberzeir | F21L 4/027 315/313 |
| 2011/0280003 A1 * | 11/2011 | Hsu | G02F 1/133603 362/97.1 |
| 2012/0140475 A1 * | 6/2012 | Huang | F21V 33/0052 362/253 |
| 2013/0114268 A1 * | 5/2013 | Shigematsu | F21S 8/00 362/308 |
| 2013/0314916 A1 * | 11/2013 | Clore | F21V 5/04 362/235 |
| 2017/0205058 A1 | 7/2017 | Ostrander | |

* cited by examiner

MULTI-PURPOSE LIGHT EMITTING DIODE FLARE

CROSS REFERENCE TO RELATED APPLICATION

This application claims priority in U.S. Provisional Patent Application No. 62/064,332, filed Oct. 15, 2014, which is incorporated herein by reference.

BACKGROUND OF THE INVENTION

1. Field of the Invention

The present invention relates generally to a light-emitting diode (LED) road flare, and more specifically to a multi-purpose, multi-function LED road flare and utility instrument.

2. Description of the Related Art

Typical chemical road flares are dangerous, unpredictable, and finite. These flares burn hot and pose fire risks. They degrade over time and may not be functional in a time of need. Once their fuel burns down, they are useless.

Existing electronic road lights and road flares, including those using light-emitting diodes (LEDs) have been used in recent years. Typically, these devices are designed merely to replace the chemical road flares of years past. However, in doing so these LED flares do not improve upon the prior art other than to exchange the light source from the fire of a road flare to the light emitted from the LED.

What is needed is an LED road flare which embraces the obvious advantages of the LED and incorporates those advantages into a road flare device which has multiple useful features.

Heretofore there has not been available a multi-purpose LED flare with the advantages and features of the present invention.

BRIEF SUMMARY OF THE INVENTION

The present invention generally provides a road flare including a two-sided panel, each side containing a grid of light-emitting diodes (LEDs). In a preferred embodiment one side would include typical white or standard colored LEDs and the other side would include red or other color LED.

Each panel has several modes of lighting, which is selectable via a power switch or other switch. The different modes include solid lights, blinking lights, off, or a combination thereof. For example, the red side of the panel may be set to blinking or flashing, while the white side of the panel could be constantly lit. This creates a flashing hazard strobe facing away from a vehicle to warn oncoming vehicles, and a solid white light source aimed towards the vehicle to assist with repairs or other tasks.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Light-Emitting Diode (LED) Flare 100

Figure 1:
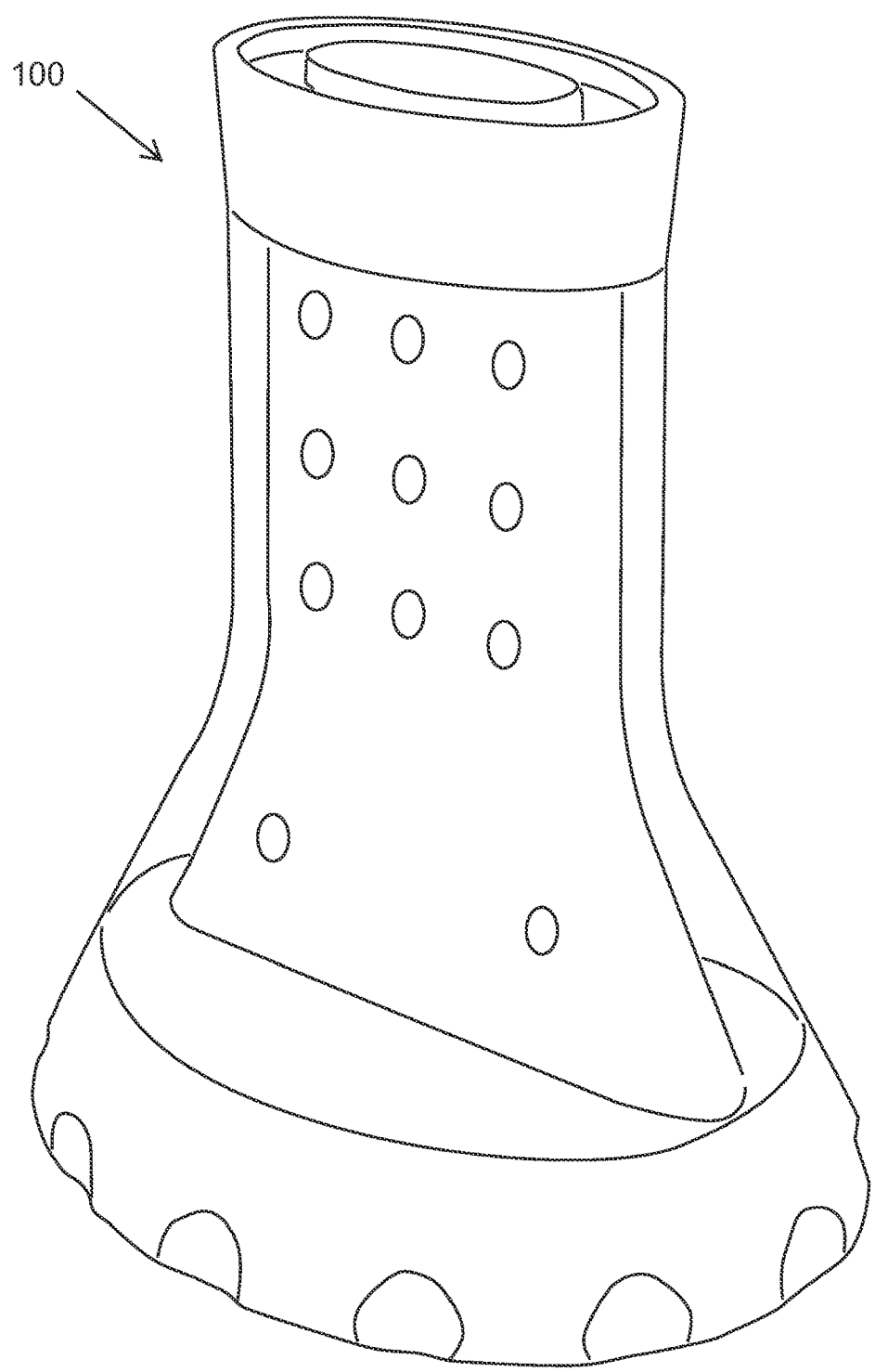
FIG. 1 is an isometric view of a preferred embodiment of the present invention.
Figure 2:
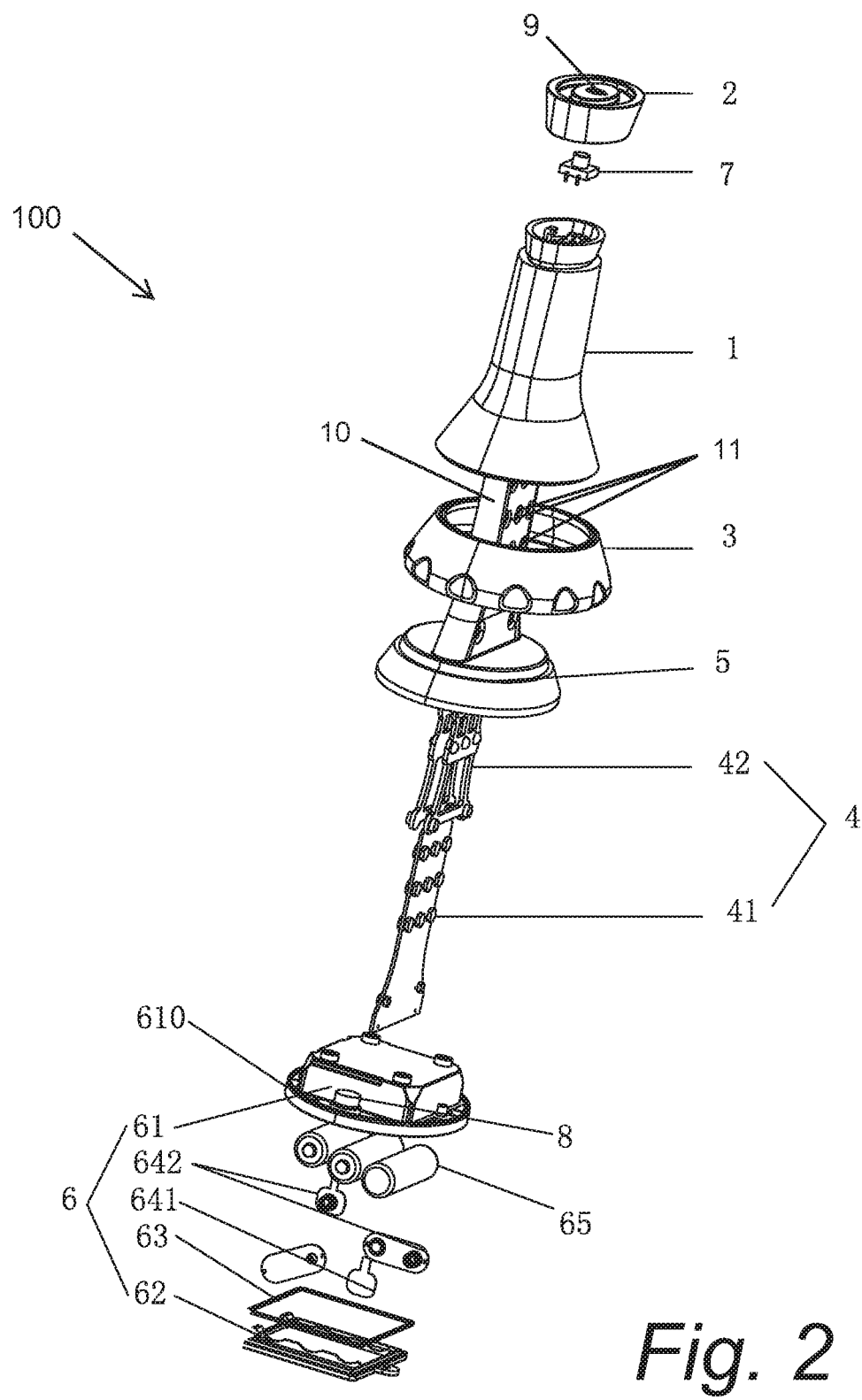
FIG. 2 is an exploded isometric view of a preferred embodiment of the present invention.
Figure 3:
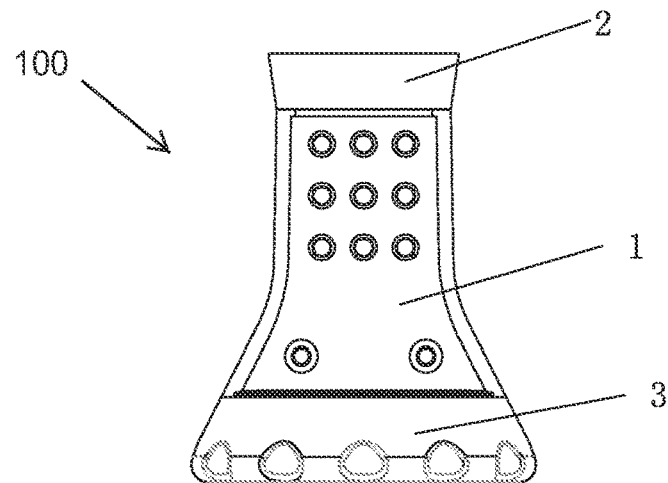
FIG. 3 is a front elevational view thereof.
Figure 4:
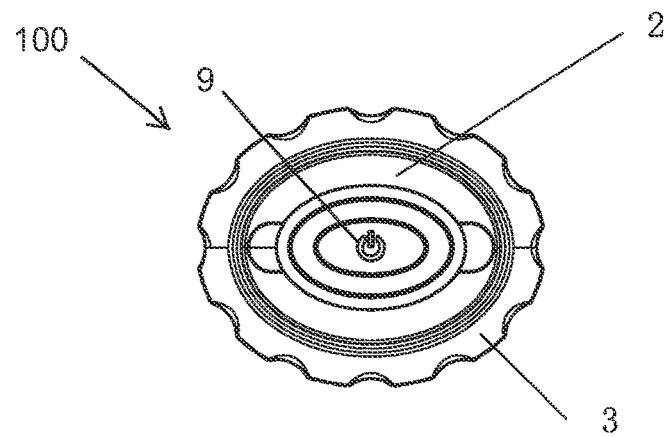
FIG. 4 is a top plan view thereof.
Figure 5:
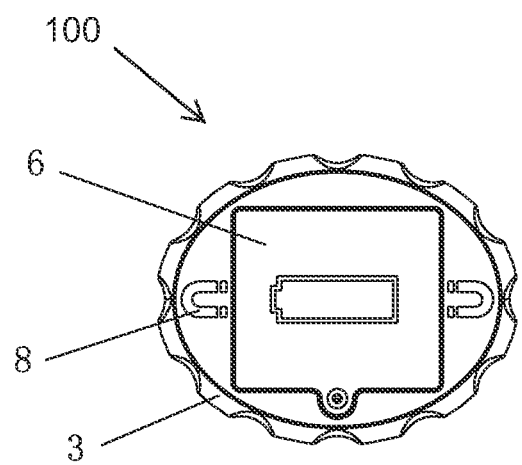
FIG. 5 is a bottom plan view thereof.

Referring to the figures, FIG. 1 shows an exploded view of the components of a LED flare 100. An LED panel 41 with a grid of LEDs located on each face is contained within a housing 42 making up the LED assembly 4. This assembly is housed within a central housing 5 which is placed over the top of the LED assembly 4. The central housing 5 has an external skin covering 10 which includes a number of holes 11 associated with the positions of the LEDs within the LED panel 41. In a preferred embodiment, one face of the LED panel 41 includes red colored LEDs and the other face of the LED panel 41 includes white colored LEDs.

A base covering 3 is placed over the base of the central housing 5, and a transparent outer housing 1 is placed on top of the base covering 3 and over the central housing 5. The transparent outer housing 1 allows the LEDs to be seen while protecting the inner circuitry and the LEDs themselves. A top cap 2 is placed over a switch 7 within the top portion of the outer housing 1. The top cap 2 includes a switch portion 9 which interacts with the switch 7 underneath of it, such that when the switch portion 9 is pressed, the switch 7 activates the LEDs in the LED panel 41.

A battery base assembly 6 is located underneath of the central housing 5 and the LED assembly 4. The battery base assembly 6 includes the battery housing 61, a removable cover 62, a cover gasket 63, a housing gasket 610, and a plurality of batteries 65 for powering the LEDs. Necessary circuitry elements 641, 642 for taking power from the batteries and delivering them to the LEDs are included within the battery housing 61. A pair of magnets 8 are also installed within the battery base. These magnets allow the flare to more easily be placed on a curved metal surface, such as the trunk or hood of an automobile.

In a preferred embodiment, the top cap 2 and base covering 3 are made of a rubbery, non-abrasive material which prevents damage to the paint of an automobile when placed on a metal surface of the automobile. They also function to protect the inner components and LEDs of the flare in case the flare is dropped or thrown.

The bell shape of the flare 100 makes it easy to stand up and difficult to accidentally knock over. The rubber material of the base covering 3 also makes it less likely that the flare 100 will be moved if accidentally brushed or bumped.

As discussed above, the flare 100 features one face of the LED panel 41 with red LEDs and the other face with white LEDs. The switch 7 cycles through lighting options. In a preferred embodiment there are at least three possible lighting options. With a first activation of the switch 7 the white LEDs will turn on while the red LEDs will remain off. This allows the flare to be used as a flashlight to light up a scene of an accident or other location. The second activation of the switch turns the white LEDs off and activates the red LEDs such that they are flashing on and off. This allows the flare 100 to be used as a warning element to other passing traffic while the user's vehicle is pulled over to the side of the road or for any other emergency situation. The third activation of the switch 7 will activate both faces of LEDs. This allows the user to set the flare down in a way that the white LEDs light up the area where the user is working while the red LEDs face in the direction of oncoming traffic to warn them of the scene. The fourth activation of the switch would turn all LEDs off. However, any combination of flashing or solid lights could be programmed into the switch 7 and delivered by the LEDs.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A light emitting diode (LED) flare comprising:
   a translucent housing containing a panel having a first face and a second face;
   said panel containing a first set of light emitting diodes (LEDs) on said first face and a second set of LEDs on said second face;
   a base affixed to a bottom of said translucent housing, said base containing a power source configured to power said first and second sets of LEDs, and said base further configured to keep the LED flare upright;
   a top cap affixed to a top of said translucent housing, said top cap including a switch configured to activate said power source and said first and second sets of LEDs;
   said power source comprising a battery;
   a battery base assembly comprising a battery housing configured for storing said battery, a removable cover, a cover gasket, a housing gasket, and wiring configured to electrically connect said battery to said first and second sets of LEDs; and
   wherein said battery base assembly is contained within said base.

2. The LED flare of claim 1, further comprising:
   a central housing comprising an external skin having a plurality of holes;
   said central housing configured to cover said panel; and
   said plurality of holes aligned with said first and second sets of LEDs such as to allow light from said plurality of LEDs to shine through said central housing.

3. The LED flare of claim 1, wherein said base is comprised of a semi-flexible polymer having a high coefficient of friction.

4. The LED flare of claim 1, further comprising:
   said first set of LEDs configured to produce a white light; and
   said second set of LEDs configured to produce a red light.

5. The LED flare of claim 4, wherein said switch is configured to activate said first set of LEDs only.

6. The LED flare of claim 4, wherein said switch is configured to activate said second set of LEDs only.

7. The LED flare of claim 4, wherein said switch is configured to activate both first and second sets of LEDs simultaneously.

8. The LED flare of claim 7, wherein said first set of LEDs are configured to flash on and off once activated.

9. The LED flare of claim 7, wherein said second set of LEDs are configured to flash on and off once activated.

10. A light emitting diode (LED) flare comprising:
    a translucent housing containing a panel having a first face and a second face;
    said panel containing a first set of light emitting diodes (LEDs) on said first face and a second set of LEDs on said second face;
    a base affixed to a bottom of said translucent housing, said base containing a power source configured to power said first and second sets of LEDs, and said base further configured to keep the LED flare upright;
    a central housing comprising an external skin having a plurality of holes;
    said central housing configured to cover said panel;
    said plurality of holes aligned with said first and second sets of LEDs such as to allow light from said plurality of LEDs to shine through said central housing;
    a top cap affixed to a top of said translucent housing, said top cap including a switch configured to activate said power source and said first and second sets of LEDs; and
    said plurality of holes aligned with said first and second sets of LEDs such as to allow light from said plurality of LEDs to shine through said central housing.

\* \* \* \* \*